United States Patent [19]

Osawa et al.

[11] 4,274,384
[45] Jun. 23, 1981

[54] ENGINE EXHAUST GAS RECIRCULATION SYSTEM

[75] Inventors: Keiichi Osawa, Asaka; Kiyoshi Ishii, Tachikawa; Hiroyuki Nishimura, Kounosu, all of Japan

[73] Assignee: Honda Giken Kogyo Kabushiki Kaisha, Tokyo, Japan

[21] Appl. No.: 70,024

[22] Filed: Aug. 27, 1979

[30] Foreign Application Priority Data

Sep. 12, 1978 [JP] Japan .................. 53-111320
Sep. 14, 1978 [JP] Japan .................. 53-112185

[51] Int. Cl.³ ............................. F02B 47/08
[52] U.S. Cl. ................................... 123/568
[58] Field of Search ........................ 123/568, 569

[56] References Cited

U.S. PATENT DOCUMENTS

| 3,739,797 | 6/1973 | Caldwell | 123/568 X |
| 3,779,222 | 12/1973 | Lorenz | 123/571 |
| 3,818,880 | 6/1974 | Dawson | 123/568 |
| 3,884,200 | 5/1975 | Caldwell | 123/568 |
| 3,915,136 | 10/1975 | Caldwell | 123/568 |
| 3,970,061 | 7/1976 | Caldwell | 123/568 |
| 4,033,308 | 7/1977 | Hayashi | 123/568 |

FOREIGN PATENT DOCUMENTS

| 1486093 | 9/1977 | United Kingdom | 123/568 |
| 1486651 | 9/1977 | United Kingdom | 123/568 |

Primary Examiner—Wendell E. Burns
Attorney, Agent, or Firm—Lyon & Lyon

[57] ABSTRACT

An exhaust gas recirculation system for an internal combustion engine employs a recirculation control valve in a passageway connecting the engine exhaust passage to the engine intake passage downstream from the throttle valve. An air conduit having an air control valve therein draws atmospheric air into the intake passage downstream from the throttle valve. Vacuum responsive actuators are provided for each of the control valves and they are operated by vacuum pressure controlled by a regulating valve, which regulating valve is responsive to differential pressure between vacuum intensity in the intake passage upstream from said throttle valve and modified atmospheric pressure. The modified atmospheric pressure is obtained downstream of a fixed or variable restriction in the air conduit.

4 Claims, 2 Drawing Figures

ENGINE EXHAUST GAS RECIRCULATION SYSTEM

This application is related to co-pending and co-assigned U.S. Patent Application Ser. No. 9,370 filed Feb. 5, 1979 by Hiroyuki Nishimura, which is incorporated herein by this reference.

This invention relates to exhaust gas recirculation apparatus for internal combustion engines and is particularly directed to an improved control system for such apparatus.

It is desirable to re-circulate exhaust gases to the engine intake passage substantially in proportion to intake flow of air to the engine. This is accomplished by the invention stated in the foregoing U.S. Patent application. However, it is necessary for good driveability and performance of the engine to vary the ratio of exhaust gas recirculation flow to intake flow of air in response to changes of operation of the engine, that is, it is required for obtaining good driveability of the engine to reduce the rate of exhaust gas recirculation during light load operation of the engine and for reducing a $NO_x$ emission from the engine to increase the rate of exhaust gas recirculation during heavy load operation of engine. The present invention is directed to a exhaust gas recirculation apparatus for varying a rate of exhaust gas recirculation in response to changes of operation of engine by means of:

(a) decreasing a vacuum intensity in a regulating valve which vacuum is introduced from a carburetor venturi section, by leaking out to atmosphere in accordance with a vacuum intensity in an intake passage downstream from a throttle valve, or (b) varying an opening area of a restriction located in an air conduit connected to an intake passage at a location downstream from a throttle and communicated to atmosphere, in accordance with vacuum intensity in the intake passage downstream from the throttle valve.

The present invention meets these requirements by providing a exhaust gas recirculation control valve in a passageway connecting the engine exhaust passage to its intake passage downstream from the throttle valve. An air conduit having a air control valve therein draws atmospheric air to the engine intake passage downstream from the throttle valve. A regulating valve controls the operation of the control valves, and the regulating valve is responsive to differential pressure between the vacuum in the intake passage upstream from the throttle valve and a modified atmospheric pressure obtained downstream from a fixed or variable restriction in the air conduit.

Other and more detailed objects and advantages will appear hereinafter.

Figure 1:
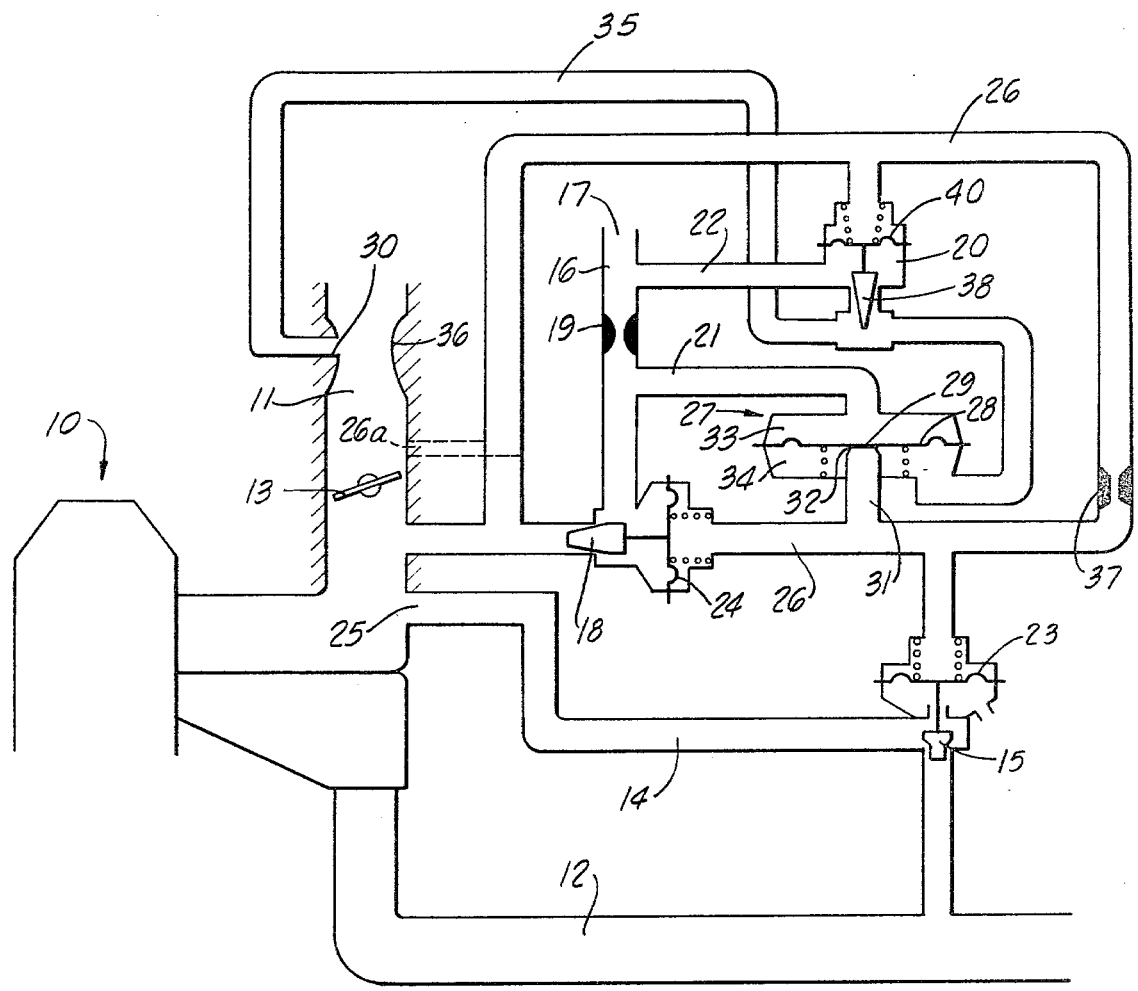
FIG. 1 is a schematic view showing a preferred embodiment of this invention.

Referring to the drawings, the engine 10 has an intake passage 11 for an air-fuel mixture, and a passage 12 for exhaust gases. A throttle valve 13 is provided in the intake passage 11. A passageway 14 connects the exhaust passage 12 to the intake passage 11 at a location downstream from the throttle valve 13, for recirculating exhaust gases into said engine 10. An exhaust gas recirculation control vale 15 is positioned in this passageway 14.

An air conduit 16 is connected to said intake passage 11 at a location downstream from said throttle valve 13 and has an opening 17 to atmosphere. An air control valve 18 is is mounted in said air conduit 16. A restriction 19 is placed in the air conduit 16 at a location between the air control valve 18 and the opening 17 to atmosphere. An air control line 21 is connected to the air conduit 16 downstream with respect to said restriction 19. Each of the control valves 15 and 18 is provided with a vacuum responsive actuator 23, 24, respectively. Each of these actuators is connected to a control pipe system 26, which is in turn connected to a second vacuum outlet 25 in the intake passage 11 downstream from the throttle valve 13 or a second vacuum outlet 26a in the vicinity of the throttle valve 13 above the idle position thereof.

A regulating valve 27 is provided with a movable diaphragm member 28 having a central non-flexible portion 29. An open ended tube 31 forming a part of the control pipe system 26 is closed and opened by contact with the central non-flexible portion 29 of the diaphragm member 28. A variable opening 32 is thus formed between the open ended tube 31 and the central portion 29 of the diaphragm member 28. The chamber 33 above the diaphragm member 28 of the regulating valve 27 is subjected to pressure in the air control line 21. The chamber 34 below the diaphragm member 28 is connected to a tube 35 which in turn is connected to a first vacuum outlet 30 in the carburetor venturi section 36.

In operation, the operating vacuum generated at the second vacuum outlet 25 in the intake passage 11 acts on the vaccum responsive actuators 23 and 24 to open the exhaust gas recirculation control valve 15 and the air control valve 18. Exhaust gases from the exhaust passage 12 are then circulated back to the intake passage 11. The vacuum intensity in the air conduit 16 between the air control valve 18 and the orifice 19 acts on the regulating valve 27 to cause the central portion 29 of the diaphragm 28 to lift away from the valve port 32. Also the vacuum intensity in the first vacuum outlet 30 introduced into the second chamber 34 through the tube 35 acts on the regulating valve 27 to cause the diaphragm 28 to close the valve port 32. Thus, the action of the regulating valve 27 is regulated by means of both vacuum intensities in the air conduit 16 between the air control valve 18 and the orifice 19 and in the first vacuum outlet 30 in the venturi portion. As the vacuum intensity at the first vacuum outlet 30 increases, the regulating valve 27 closes and acts to raise the vacuum pressure in the vacuum responsive actuators 23 and 24, with the result that the rate of flow of exhaust gas circulation also increases.

From the foregoing description, it will be understood that the operating vacuum from the intake passage acting on a control valve is regulated by a regulating valve placed in a passageway connecting the intake passage to atmosphere. The regulating valve responds in proportion to the engine load and therefore the control of introduction of gas is accomplished in a direct manner. The exhaust gas recirculation control valve and the air control valve operate synchronously with each other so that by measuring the rate of flow through the orifice leading to atmosphere and selecting the flow characteristics of the air control valve on the basis thereof, various rates of the additional gas flow introduced into an engine can be established.

In accordance with this invention, a branch 22 from the air conduit 16 leads to the chamber 20 below the flexible diaphragm 40. The other side of the diaphragm 40 is subjected to vacuum pressure in the tube 35. A restriction 37 is placed in the control pipe system 26 between the second vaccum outlet 25 and the actuators 23, 24 and 28. The air induction valve 38 controls flow of air through the branch 22 into the tube 35, the extent of opening of the valve 38 being controlled by differential pressure across the diaphragm 40.

In operation, the air induction valve 38 remains closed when the differential pressure across the diaphragm 40 is low. The intensity of the vacuum in the tube 35 remains high, thereby urging the diaphragm 28 in the regulating valve 27 to move in a direction to close the opening 32. Leakage from the tube 31 into the chamber 34 is thus restricted, with conseguent loss of intensity of the vacuum in the control pipe system 26. The recirculation control valve 15 then moves toward open position to increase the rate of exhaust gas recirculation through the passageway 14 and into the intake passage 11 of the engine 10.

When the intensity of the vacuum in the control pipe system 26 increases, the differential pressure across the diaphragm 40 increases to move the air induction valve 38 toward open position. Atmospheric air then flows from the branch 22 through the valve 38 and into the tube 35, thereby reducing the intensity of the vacuum in the chamber 34. This causes the central poriton 29 of the diaphragm 28 to move away from the tube 31 to increase the size of the opening 32. This in turn reduces the intensity of the vacuum in the control pipe system 26 with the result that the recirculation control valve 15 is moved toward closed position. This reduces the flow of exhaust gas through the passageway 14 into the intake passage 11 of the engine 10.

Figure 2:
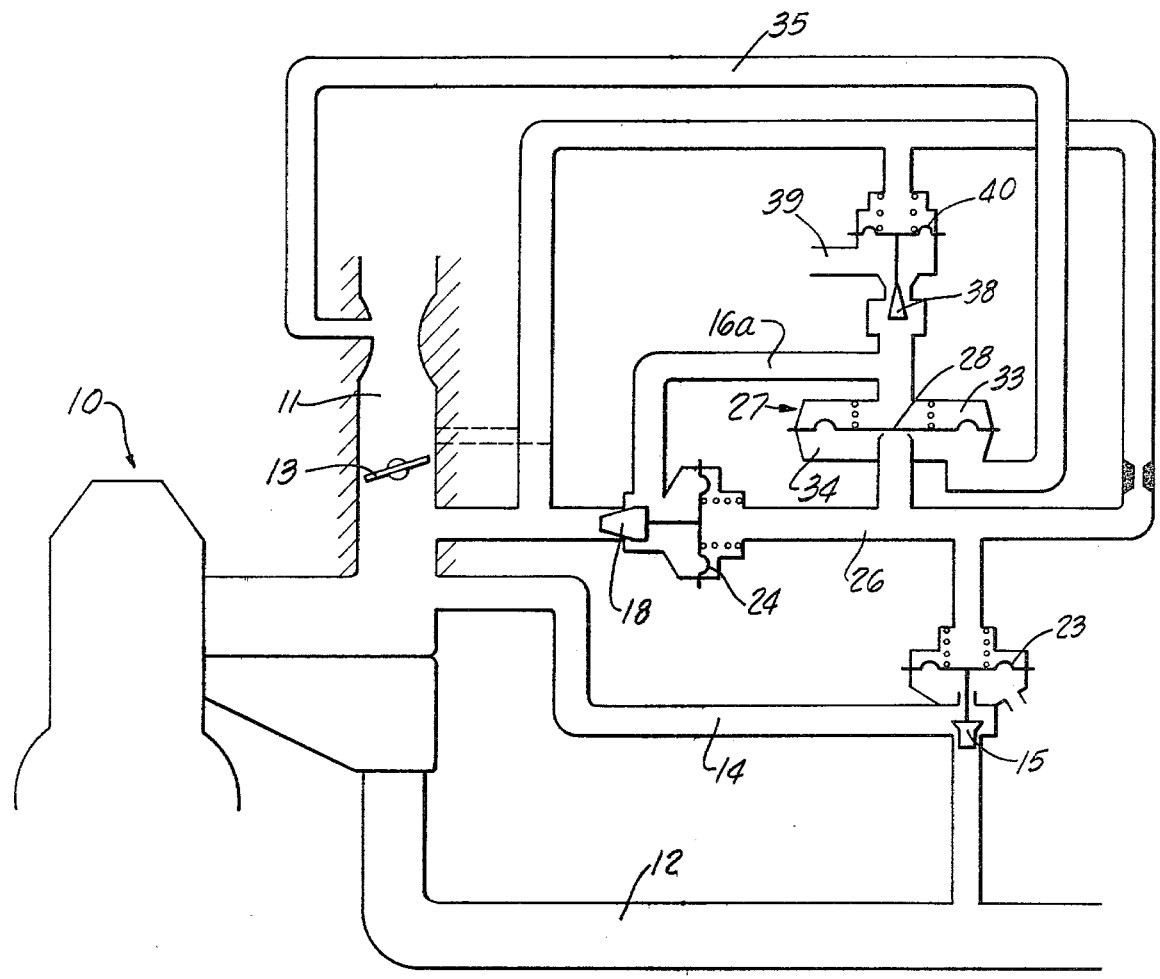
FIG. 2 is a view similar to FIG. 1 showing a modification.

In the modified form of the invention shown in FIG. 2, the parts and connections are the same as that previously described except that the air induction valve 38 controls flow of atmospheric air into the air conduit 16a upstream from the air control valve 18.

The differential pressure across the diaphragm 28 is thus varied by varying the vacuum intensity of the air in the chamber 33, instead of varying the vacuum intensity in the chamber 34, as in the device of FIG. 1.

Having fully described our invention, it is to be understood that we are not to be limited to the details herein set forth but that our invention is of the full scope of the appended claims.

We claim:

1. In an internal combustion engine having an intake passage for delivering an air-fuel mixture into the engine, a throttle valve in the intake passage, and an exhaust passage for carrying exhaust gases from the engine, the improvement comprising, in combination: a passageway connecting the exhaust passage to the intake passage downstream from the throttle valve for recirculating exhaust gases into said engine, a first control valve in said passageway, an air conduit connecting said intake passage downstream from said throttle valve to atmosphere, a second control valve in said air conduit, each of said control valves having a vacuum responsive actuator, said air conduit having a restriction device located between its opening to atmosphere and said second control valve, a vacuum line connected to said intake passage upstream from said throttle valve, a regulating valve responsive to differential pressure between vacuum pressure in said vacuum line and vacuum pressure in said air control line downstream from said restriction device, a control pipe system connecting said vacuum responsive actuators to said intake passage near said throttle valve, means whereby said regulating valve acts through said control pipe system to operate said vacuum responsive actuators for said control valves, and an air induction valve responsive to vacuum pressure in said control pipe system and operatively positioned to change said differential pressure.

2. The combination set forth in claim 1 in which said regulating valve has a variable opening for bleeding said control pipe system into said vacuum line.

3. The combination set forth in claim 1 in which the air induction valve is operatively connected to change the intensity of the vacuum in said vacuum line by bleeding atmospheric air into it.

4. The combination set forth in claim 1 in which the air induction valve is operatively connected to vary the air pressure supplied to the regulating valve.

* * * * *